3,657,370
PROCESS FOR THE PREPARATION OF DI-
TERTIARY-AROMATIC HYDROCARBONS
William C. Hammann, Creve Coeur, and Charles F.
Hobbs, Des Peres, Mo., assignors to Monsanto Company, St. Louis, Mo.
No Drawing. Filed Jan. 2, 1970, Ser. No. 433
Int. Cl. C07c 3/56
U.S. Cl. 260—671 R                    10 Claims

ABSTRACT OF THE DISCLOSURE

Di-t-alkyl aromatics are obtained in good yield and in preference to secondary isomers by alkylating benzene or naphthalene with an olefin or a t-alkyl halide using $FeBr_3$ as a catalyst. Compounds having t-alkyl groups of 8 to 28 carbon atoms which are useful as oxidatively stable functional fluids are prepared by this process.

BACKGROUND OF THE INVENTION

Field of the invention

This invention relates to di-t-alkyl aromatic hydrocarbons and to a method for the preparation thereof.

Description of the prior art

The alkylation of aromatics such as benzene, naphthalene, toluene and the like is well known in the art. In a common method of the prior art, the alkylation is accomplished by reacting the aromatic compound with the selected alkylating agent in the presence of a Friedel-Crafts catalyst such as $AlCl_3$ or $AlBr_3$. In most instances the action proceeds quickly and easily to produce the alkylated aromatics in good yield.

A problem has been recognized when attempting to apply the Friedel-Crafts alkylation to the production of t-alkyl aromatics due to the isomerization of the tertiary structure to the secondary structure. This phenomenon was reported by Schmerling and West in J. Am. Chem. Soc. 76, 1917 (1954) where it was concluded that the aluminum chloride catalyzed alkylation of benzene tends to yield secondary rather than tertiary alkyl benzene as the major product.

The preparation of mono- and di-t-alkyl aromatics has been the subject of much investigation. Several catalysts have been found which are useful in certain restricted alkylation reactions and which do not cause isomerization to the secondary structure. In the Schmerling reference above for example, it was found that either ferric chloride or a nitromethane solution of aluminum chloride could be used in the alkylation of benzene with t-hexyl-chloride to yield chiefly the t-hexylbenzene isomer.

In U.S. Pat. 3,324,192 a double salt of an aluminum halide and an alkaline metal halide is used as the catalyst to react isoolefins or t-alkyl halides with mono-nuclear aromatics to yield t-alkyl aromatics. Similarly in U.S. Pat. 2,737,536 sulfuric acid is used as the catalyst to synthesize tertiary alkyl substituted aromatics. In yet another process as described in U.S. Pat. 2,915,568, hydrogen fluoride is used to prepare p(t-alkylated)alkyl benzenes.

The methods disclosed in the art for preparing t-alkyl aromatics are generally satisfactory when the alkylating agent is an isoolefin of 4 or 5 carbon atoms, or more specifically, when it is desired to prepare the t-butyl or t-amyl aromatics. We have found however that the prior art processes and catalysts are generally not satisfactory when attempting to react higher molecular weight alkylating agents with aromatics such as benzene or naphthalene. In these cases the products of the reaction contain an unacceptably high concentration of the secondary isomer or there is formed excessive amounts of olefin dimer and polymer.

It is therefore an object of the present invention to provide a process for the preparation of t-alkyl aromatics. It is another object of this invention to provide an effective catalyst for the reaction of isoolefins and aromatics to yield predominantly t-alkylated aromatics with a minimum amount of the secondary isomer and olefin dimers and polymers. Yet a further object of this invention is to provide a process for the preparation of mono- and di-t-alkyl aromatics in which the t-alkyl groups have 8 or more carbon atoms.

SUMMARY

High molecular weight mono- and di-t-alkyl benzenes and naphthalenes are prepared by reacting the selected aromatic with an isoolefin or a t-alkyl halide having from about 8 to 28 carbon atoms in the presence of a catalytic amount of ferric bromide.

The reaction is preferably conducted in a liquid phase saturated with hydrogen chloride and at a temperature of from about 0 to 10° C. Catalyst concentration, molar ratios of reactants, and the amount of hydrogen chloride employed are controlled to obtain good yields of the desired di-t-alkyl aromatic product.

DESCRIPTION OF PREFERRED EMBODIMENTS

The method of this invention provides for the reaction of an aromatic and a tertiary alkylating agent in the presence of a ferric bromide catalyst under defined conditions of temperature and concentration of reactants and catalyst which yield a predominate amount of the di-t-alkylated product. The secondary reactions forming mono-sec-alkylates, di-sec-alkylates and mixed tert-sec-alkylates are minimized. When isoolefins are selected as the alkylating agent, the method of this invention retards the formation of dimers and polymers of the olefin.

Alkylation according to this invention favors the formation of the di-t-alkylate over the mono-t-alkylate and other isomers. Any mono-t-material formed however, can be recovered and further alkylated to the desired di-tertiary product.

The aromatics which are alkylated in accordance with this invention can be substituted or unsubstituted and include benzene, naphthalene, toluene, alkyl benzene, mono-t-alkyl benzene, alkyl naphthalene, mono-t-alkyl naphthalene, phenyl naphthalene, diphenyl, alkyl diphenyl, and the like. When benzene or naphthalene is used as the starting material, and the other conditions of reaction are in accordance with this invention, the products of the reaction comprise a major amount of the corresponding di-t-alkyl benzene or naphthalene and a minor amount of the corresponding mono-t-alkyl reaction product.

The tertiary alkylating agents may be either isoolefins or t-alkyl halides. The isoolefins are generally preferred for reasons of lower raw material costs, and better yields of the di-t-alkyl product. In the alkylation of benzene with 2-hexyl-1-decene for example, less isomerization of the alkyl group occurred than during a similar alkylation with the corresponding t-alkyl halide, 7-chloro-7-methyl pentadecane. Specifically, the alkylation with the olefin resulted in 95% of the alkyl groups having the tertiary structure, as compared to 89% for alkylation with the halide.

Alkylating agents suitable for use in this invention are those having from about 4 to 28 carbon atoms and, where the di-t-alkylated aromatic is intended for use as a lubricating fluid, the alkylating agents preferably contain at least 8 carbon atoms.

Isolefins suitable for use in this invention are those corresponding to the structure

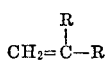

where each R is individually selected from alkyl groups having 1 to 18 carbon atoms and is preferably selected to provide a total of from about 8 to 28 carbon atoms in the olefin. Examples of such isoolefins include isobutylene, 2 - methyl - 1 - butene, 2 - ethyl - 1 - butene, 2 - ethyl - 1 - hexene, 2 - ethyl - 1 - octene, 2-ethyl-1-decene, 2 - butyl - 1 - hexene, 2 - butyl - 1 - octene, 2-butyl - 1 - decene, 2 - butyl - 1 - dodecene, 2-butyl-1-eicosene, 2 - hexyl - 1 - octene, 2 - hexyl - 1 - decene, 2 - hexyl - 1 - dodecene, 2 - hexyl - 1 - octadecene, 2-octyl - 1 - dodecene, 2 - octyl - 1 - decene, 2 - decyl-1-dodecene, 2 - decyl - 1 - tetradecene and 2 - dodecyl-1-tetradecene.

Tertiary alkyl halides useful in this invention are those which correspond to the structure

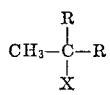

where X is bromine or chlorine and each R is individually selected from alkyl groups having 1 to 18 carbon atoms and is preferably selected to provide a total of from about 8 to 28 carbon atoms in the structure. Examples of such tertiary alkyl halides include t-butyl chloride,
2-chloro-2-methyl butane,
3-chloro-3-methyl pentane,
3-chloro-3-methyl heptane,
3-chloro-3-methyl nonane,
3-chloro-3-methyl undecane,
5-chloro-5-methyl undecane,
5-chloro-5-methyl tridecane,
5-chloro-5-methyl pentadecane,
5-chloro-5-methyl tricosane,
7-chloro-7-methyl tridecane,
7-chloro-7-methyl pentadecane,
7-chloro-7-methyl heptadecane,
7-chloro-7-methyl tricosane,
9-chloro-9-methyl nonadecane,
9-chloro-9-methyl heptadecane,
11-chloro-11-methyl heneicosane,
11-chloro-11-methyl tricosane, and
13-chloro-13-methyl pentacosane.

The alkylation with isoolefins is preferably conducted in the presence of an excess amount of hydrogen chloride in order to retard the polymerization of the olefin. If only a catalytic amount of hydrogen chloride is used as a co-catalyst with the ferric bromide, olefin polymerization is the major course of the reaction, and may convert from 40–55% of the olefin. When an excess of hydrogen chloride is used, the formation of olefin dimers and polymers is held to a minimum, generally less than 5%. By excess hydrogen chloride it is meant that more than a catalytic amount is employed in the reaction, and that the reactants are saturated or at least nearly saturated with the gas.

The ratio of reactants expressed as moles of aromatic compound to moles of alkylating agent can be from about 0.3:1 to about 5:1 with the preferred ratio being from about 0.3:1 to 1:1. The ratio of the reactants determines to a large extent the relative proportions of the mono- and di-alkylates formed and it is preferred that the alkylating agent be present in at least a molar equivalent to the aromatic compound in order to assure preferential conversion to the di-t-alkylate. In one example, when a 1:1 ratio of reactants was used the product contained 23.8% of the mono- and 52.2% of the di-alkylate, while a 5:1 molar excess of the aromatic produced 84.7% of the mono-alkylate and only 10.2% of the di-alkylate.

In both instances, however, the use of the ferric bromide catalyst of this invention resulted in more than 90% of the alkylate formed being the tertiary-isomer.

The temperature of the reaction can be from about 0 to about 20° C. and is preferably between 0 and 10° C. A reaction time in the order of from about 0.5–3 hours is generally sufficient for the reaction to reach equilibrium in the preferred temperature range. The reaction may be continued for longer periods but no commensurate improvement in results is obtained thereby. In general the alkylation reaction of this invention should be conducted in accordance with established liquid phase alkylation conditions.

The concentration of the ferric bromide catalyst in the reaction can be from about 0.02 to 0.3 mole per mole of aromatic being alkylated with the preferred amount being from about 0.07 to about 0.2 mole in order to promote the highest yield of the desirable di-t-alkylate product.

The t-alkyl halides used as alkylating agents in this invention are preferably the chlorinated rather than the brominated compounds. Comparison of the conversions obtained in the reaction of benzene with 7-halo-7-methyl-pentadecane has shown that the tertiary bromide favors the formation of monalkylates at the expense of di-alkylates and further promotes the isomerization of the alkyl groups to the secondary structure. The substitution of hydrogen bromide gas for the hydrogen chloride during the alkylation reaction has a similar detrimental effect on the yield of the di-t-alkylate.

All analyses of reaction product mixtures were performed on a gas chromatograph programmed for an operating temperature of 150° to 300° C. increasing at 11° C. per minute. Duplicate analysis indicated a precision of ±2 relative percent for conversions to the mono-alkylate and the di-alkylate, and for the percentage of tertiary isomer in the mono-alkylate. The yield of di-t-alkylate was calculated according to the following formula:

Percent yield of di-t-alkylate $$= \left(\begin{array}{c}\text{percent conversion to}\\ \text{di-alkylate}\end{array}\right) \times \left(\begin{array}{c}\text{percent t-isomer in}\\ \text{mono-alkylate}\end{array}\right)^2$$

on the basis that the relative proportion of t-isomer is the same in both the mono-alkylate and di-alkylate reaction products.

The following examples are provided to illustrate the alkylation reaction of this invention and to demonstrate the effect of reaction variables upon the yield of the di-t-alkylate. The examples are provided for the purpose of illustration only, and the invention is not intended to be limited thereby. All percentages in the examples are by weight unless otherwise specified.

EXAMPLE I

Effect of catalyst on the alkylation of benzene with 2-hexyl-1-decene 0.10 mole of benzene and 0.02 mole of alkylation catalyst were added to a 100 ml. laboratory reactor equipped with a gas dispersion stir and immersed in an ice bath. The reactor contents were cooled to about 3° C. and saturated with hydrogen chloride gas.

0.20 mole of the 2-hexyl-1-decene olefin were added dropwise to the reactor over a period of 25 minutes, and agitation continued for an additional 5 minutes. Hydrogen chloride gas was continuously bubbled through the reaction mass during the addition period.

At the end of the reaction period the reaction was quenched by shaking vigorously with ice and water. The organic layer was washed with water and a 10% sodium bicarbonate solution was dried over anhydrous $K_2CO_3$. The resulting organic layer was distilled and analyzed by gas chromotography to obtain the conversion and yield of the bis(1-methyl-1-hexyloctyl)-benzene dialkylate as shown in Table I below:

TABLE I

| Catalyst | Conversion percent | | | Percent t-isomer in mono-alkylate | Yield, percent di-t-alkylate |
|---|---|---|---|---|---|
| | Mono-alkylate | Di-alkylate | Olefin polymer | | |
| Run: | | | | | |
| 1........ $FeBr_3$ | 9.1 | 37.1 | 6.1 | 95 | 33.4 |
| 2........ $FeCl_3$ | 3.3 | 14.1 | 8.3 | 95 | 12.7 |
| 3........ $AlCl_3$ | 29.0 | 22.7 | 44.6 | 87 | 4.0 |
| 4........ $AlCl_3 \cdot CH_3NO_2$ | 5.2 | 11.3 | 39.6 | 86 | 8.5 |
| 5........ $BF_3 \cdot H_3PO_4$ a | 13.3 | 0.1 | 73.1 | | |
| 6........ $H_2SO_4$ b | 16.5 | 4.7 | 70.5 | 89 | 3.3 | a Run at 25° C. no HCl gas purge.
b Material losses due to emulsion.

The above data show the effect of the catalyst type on the alkylation reaction and in particular on the yield of the di-t-alkylate product. It is evident from these data that the $FeBr_3$ catalyst of this invention is greatly superior to the known alkylation catalysts of the prior art.

EXAMPLE II

Effect of catalyst upon the alkylation of benzene with 7-chloro-7-methylpentadecane The alkylation reaction described in Example I was repeated by reacting 0.10 mole of benzene and 0.20 mole of 7-chloro-7-methylpentadecane in the presence of 0.02 mole of either $FeBr_3$ or $FeCl_3$ catalyst. The superiority of the ferric bromide catalyst was clearly evident in the yield of the bis-(1-methyl-1-hexyloctyl)benzene dialkylate as shown by the data in Table II below:

TABLE II

| Catalyst | Conversion, percent | | Percent t-isomer in mono-alkylate | Yield, percent di-t-alkylate |
|---|---|---|---|---|
| | Mono-alkylate | Di-alkylate | | |
| Run: | | | | |
| 7........ $FeBr_3$ | 9.8 | 33.5 | 89 | 26.5 |
| 8........ $FeCl_3$ | 3.2 | 16.5 | 90 | 13.3 |

EXAMPLE III

Effect of reactant concentrations upon the alkylation of benzene with 7-chloro-7-methylpentadecane The effect of catalyst concentration and ratio of reactants was determined by a series of runs under the same conditions as described for Example I, using 7-chloro-7-methylpendecane as the alkylating agent and ferric bromide as the alkylating catalyst. The data obtained are summarized in Table III below:

TABLE III

| | Reactants, moles | | | Conversion, percent | | Percent t-isomer in mono-alkylate | Yield, percent di-t-alkylate |
|---|---|---|---|---|---|---|---|
| | Benzene | t-Alkyl halide | $FeBr_3$ | Mono-alkylate | Di-alkylate | | |
| Run: | | | | | | | |
| 9........ | 0.1 | 0.1 | 0.03 | 33.9 | 46.9 | 85 | 33.9 |
| 10....... | 0.1 | 0.1 | 0.02 | 21.0 | 53.1 | 91 | 44.0 |
| 11....... | 0.1 | 0.1 | 0.01 | 23.8 | 52.2 | 91 | 43.3 |
| 12....... | 0.1 | 0.1 | 0.0075 | 20.4 | 49.9 | 92 | 42.2 |
| 13....... | 0.1 | 0.25 | 0.02 | 14.3 | 48.6 | 92 | 40.1 |
| 14....... | 0.5 | 0.1 | 0.01 | 84.7 | 10.2 | 92 | 8.6 |

The above data show that the catalyst and reactants can vary over a range of concentrations without adversely affecting the yield of the desirable di-t-alkylate product. Specifically, these data show the catalyst may vary from 0.075 to 0.2 mole per mole of benzene with little effect upon the yield of di-alkylate. The data also show that the mole ratio of alkylating agent to benzene should be at least 1:1 for good yields and that when the benzene is present in a large excess such as 5:1, the reaction goes primarily to the mono-alkylate and the yield of di-tertiary alkylate is very low.

EXAMPLE IV

Effect of halogen on alkylation reaction

The effects of the halogen element in the halogen gas purge and in the 7-halo-7-methylpentadecane alkylating agent was determined in a series of runs according to the procedure of Example I in which 0.10 mole benzene was alkylated with 0.10 mole of the t-alkyl halide and 0.075 mole of ferric bromide catalyst. The data in Table IV below show the adverse effect of substituting bromine for chlorine in either the halogen gas or in the alkylating agent. It is clear from this data that more satisfactory yields of the desirable di-t-alkylate product are obtained when using the chlorine containing compounds.

TABLE IV

| | Alkylating agent [1] | Halogen gas | Conversion percent | | Percent t-isomer in mono-alkylate | Yield, percent di-t-alkylate |
|---|---|---|---|---|---|---|
| | | | Mono-alkylate | Di-alkylate | | |
| Run: | | | | | | |
| 15...... | Cl | HCl | 20.4 | 49.9 | 92 | 42.2 |
| 16...... | Cl | HBr | 66.7 | 10.8 | 73 | 7.1 |
| 17...... | Br | HCl | 31.3 | 5.4 | 81 | 2.9 |

[1] 7-halo-7-methylpentadecane.

EXAMPLE V

Alkylation of naphthalene with 7-chloro-7-methylpentadecane

A mixture of 1.0 mole of naphthalene, 0.40 mole of 7-chloro-7-methylpentadecane, and 100 ml. of n-heptane was charged to a reactor and cooled to 4° C. To this mixture was added 0.10 mole of anhydrous ferric bromide catalyst. An additional 0.60 mole of ice-cold 7-chloro-methylpentadecane was then added over a period of 10 minutes followed by the addition of 0.03 mole of anhydrous ferric bromide. The reaction was allowed to proceed to completion as indicated by the cessation of hydrogen chloride gas evolution, which took place after about 2½ hours reaction time. The reaction mixture was then filtered into a mixture of hydrochloric acid and ice and the organic layer separated, washed with water and sodium bicarbonate solution, and dried over anhydrous potassium carbonate. The mono-alkylated and di-alkylated products were separated by distillation and analyzed by gas chromatography to determine the conversion and yield of the bis(1-methyl-1-hexyl-nonyl)naphthalene dialkylate as shown in Table V below.

TABLE V (RUN 18)

Conversion (percent alkylate):

| | |
|---|---|
| Mono- | 34 |
| Di- | 39 |
| Percent t-isomer in mono-alkylate | 98 |
| Yield percent di-t-alkylate | 37.4 |

The preceding examples serve to illustrate the method of this invention for the tertiary alkylation of aromatics and the permissible variations in ratios and compositions of the reactants and the catalysts. It is expected that some variation beyond the limits shown in the examples or described in the specification can be practiced without any major adverse effect upon the yield of the di-tertiary alkylated material and such variations are considered to be within the scope of this invention.

As mentioned previously, it is contemplated that alkylating agents other than those described in the examples can be used to prepare other useful di-t-alkylates according to the method of this invention. Typical examples of such useful dialkylates include, among others, bis(1-methyl-1-ethylpentyl)benzene,
bis(1-methyl-1-butylpentyl)benzene,
bis(1-methyl-1-butylheptyl)benzene,
bis(1-methyl-1-butylnonadecyl)benzene,
bis(1-methyl-1-butylnonyl)benzene,
bis(1-methyl-1-hexylheptyl)benzene,
bis(1-methyl-1-hexylnonyl)benzene,
bis(1-methyl-1-hexylundecyl)benzene,
bis(1-methyl-1-octylnonyl)benzene,
bis(1-methyl-1-octylundecyl)benzene and
bis(1-methyl-1-decyltridecyl)benzene.

Also included within the scope of this invention are the unsymmetrical di-t-alkylates, typical examples of which include, among others, 1-(1-methyl-1-butylheptyl)-4-(1-methyl-1-hexylnonyl)-benzene
1-(1-methyl-1-butylheptyl)-4-(1-methyl-1-butylnonyl)-benzene
1-(1-methyl-1-butylnonyl)-4-(1-methyl-1-octylundecyl)-benzene
1-(1-methyl-1-hexylnonyl)-4-(1-methyl-1-octylundecyl)-benzene
1-(1-methyl-1-ethylpentyl)-4-(1-methyl-1-hexylnonyl)-benzene
1-(1-methyl-1-butylnonadecyl)-4-(1-methyl-1-hexylnonyl)benzene
1-(1-methyl-1-butylnonadecyl)-4-(1-methyl-1-octylundecyl)benzene
1-(1-methyl-1-octylnonyl)-4-(1-methyl-1-octylundecyl)-benzene.

A similar variety of dialkylates can be prepared by the alkylation of naphthalene in place of benzene. All such variations are considered to be within the scope of the present invention.

The embodiments of this invention in which an exclusive property or privilege is claimed are defined as follows:

1. A method for preparing di-t-alkyl aromatics which comprises reacting about 0.3 to 5 moles of a tertiary alkylating agent selected from the group consisting of isoolefins and t-alkyl halides having from about 4 to 28 carbon atoms and one mole of an alkylatable aromatic compound in a liquid phase at a temperature of from about 0 to 20° C. and in the presence of a catalytic amount of $FeBr_3$.

2. A method of claim 1 wherein the reaction temperature is from 0 to 10° C.

3. A method of claim 1 wherein the molar ratio of the tertiary alkylating agent to the aromatic compound is at least 1:1.

4. A method of claim 1 wherein the catalytic amount of ferric bromide is from about 0.02 to 0.3 mole of ferric bromide per mole of aromatic compound.

5. A method of claim 1 wherein the aromatic compound is selected from the group consisting of benzene and naphthalene and the tertiary alkylating agent is selected from the group consisting of isoolefins and tertiary alkyl halides.

6. A method of claim 5 wherein the alkylating agent is an isoolefin and the alkylating conditions include the presence of an excess of hydrogen chloride gas.

7. A method of claim 6 wherein the isoolefin is a 2-alkyl-1-alkene having a total of 8 to 28 carbon atoms.

8. A method of claim 7 wherein the isoolefin is 2-hexyl-1-decene.

9. A method of claim 5 wherein the alkylating agent is a tertiary alkyl chloride having from about 8 to 28 carbon atoms.

10. A method of claim 9 wherein the tertiary alkyl chloride is 7-chloro-7-methylpentadecane.

References Cited

UNITED STATES PATENTS

| | | | |
|---|---|---|---|
| 3,403,195 | 9/1968 | Patton et al. | 260—671 P |
| 3,306,943 | 2/1967 | Sulo et al. | 260—671 P |

OTHER REFERENCES

Tsukervanik et al., Tr. Tashkent. Politekh. Inst. 1968, No. 42, 108–115 (USSR).

CURTIS R. DAVIS, Primary Examiner

U.S. Cl. X.R.

260—671 C, 671 P